US011575665B2

(12) United States Patent
Fredrickson et al.

(10) Patent No.: US 11,575,665 B2
(45) Date of Patent: Feb. 7, 2023

(54) AUTHORIZING USES OF GOODS OR SERVICES USING BONDING AGREEMENT

(71) Applicant: International Business Machines Corporation, Armonk, NY (US)

(72) Inventors: Mark S. Fredrickson, Rochester, MN (US); Scott D. Frei, Rochester, MN (US); Chad Albertson, Rochester, MN (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 17/113,280

(22) Filed: Dec. 7, 2020

(65) Prior Publication Data

US 2022/0182371 A1    Jun. 9, 2022

(51) Int. Cl.
*G06Q 20/00* (2012.01)
*H04L 9/40* (2022.01)
(Continued)

(52) U.S. Cl.
CPC ....... *H04L 63/0807* (2013.01); *G06Q 20/385* (2013.01); *G06Q 20/4097* (2013.01); *H04L 63/10* (2013.01)

(58) Field of Classification Search
CPC .................................................. G06Q 20/385
See application file for complete search history.

(56) References Cited

U.S. PATENT DOCUMENTS 7,295,832 B2    11/2007 Hewel
10,652,019 B1    5/2020 Nicolas et al.
(Continued)

FOREIGN PATENT DOCUMENTS

WO    2019105407 A1    6/2019

OTHER PUBLICATIONS

Authorization Transparency for Accountable Access to IoT Services; 2019 IEEE International Congress on Internet of Things (ICIOT) (pp. 91-99) Authors: Luca Ferretti • Francesco Longo • Michele Colajanni • Giovanni Merlino • Nachiket Tapas (Year: 2019).*

A Blockchain-Based Micro Economy Platform for Distributed Infrastructure Initiatives; 2018 IEEE International Conference on Software Architecture (ICSA) (pp. 11-1109) Authors: Jan Kramer • Jan Martijn van der Werf • Johan Stokking • Marcela Ruiz (Year: 2018).*

(Continued)

*Primary Examiner* — Bruce I Ebersman
*Assistant Examiner* — John A Anderson
(74) *Attorney, Agent, or Firm* — Patterson + Sheridan, LLP

(57) ABSTRACT

Aspects described herein include a computer-implemented method (and related system and computer program product) comprising receiving, from a bonding service, an authorization request for a predefined authorized use of a good or service by a user. The authorization request indicates that the user meets one or more predefined criteria for the predefined authorized use. The method further comprises determining one or more penalty conditions of a bonding agreement for the predefined authorized use by the user, and receiving, from the bonding service, a confirmation that the user agrees to meet the one or more penalty conditions of the bonding agreement. The method further comprises receiving, from an owner of the good or service, an authorization of the authorization request, and transmitting, responsive to authorization of the authorization request, a token to the bonding service that enables the user to access the predefined authorized use of the good or service.

6 Claims, 6 Drawing Sheets

(51) Int. Cl.
*G06Q 20/40* (2012.01)
*G06Q 20/38* (2012.01)

(56) References Cited

U.S. PATENT DOCUMENTS

| | | | |
|---|---|---|---|
| 2004/0039704 A1* | 2/2004 | Gilliam | H04L 63/0428 705/50 |
| 2007/0156429 A1* | 7/2007 | Godar | G06Q 10/06 705/5 |
| 2011/0066523 A1 | 3/2011 | Harrison, Jr. | |
| 2014/0283123 A1* | 9/2014 | Lonstein | H04L 63/10 726/28 |
| 2017/0278100 A1 | 9/2017 | Kraemer et al. | |
| 2020/0117690 A1* | 4/2020 | Tran | G06F 16/90332 |
| 2020/0162268 A1 | 5/2020 | Wentz | |
| 2020/0294129 A1* | 9/2020 | Cella | G16Y 40/10 |
| 2020/0351657 A1* | 11/2020 | Wentz | H04L 9/3255 |
| 2021/0382831 A1* | 12/2021 | Sun | H04L 9/0861 |

OTHER PUBLICATIONS

Bishop,. "Review of bitcoin scaling proposals." Scaling Bitcoin Workshop Phase. vol. 1. 2015.

Seneviratne et al., "An authorised pseudonym system for privacy preserving location proof architectures." Proceedings of the Twelfth Australasian Information Security Conference—vol. 149. 2014.

Galice et al. "A history-based framework to build trust management systems." 2006 Securecomm and Workshops. IEEE, 2006.

A White Paper from the Sovrin Foundation, "Sovrin: A Protocol and Token for Self-Sovereign Identity and Decentralized Trust," Version 1.0, Jan. 2018, 48 pages.

Wikipedia, "Zero-Knowledge Proof," https://en.wikipedia.org/wiki/Zero-knowledge_proof [retrieved from online Oct. 15, 2020].

MSP Implementation with Identity Mixer-hyperledger-fabricdocs master documentation, 1 pages, accessed online Oct. 15, 2020 [https://hyperledger-fabric.readthedocs.io/en/release-1.3/idemix.html.

IBM, "Identity Mixer," 1 page, accessed online on Oct. 15, 2020 [https://researcher.watson.ibm.com/researcher/view].

* cited by examiner

AUTHORIZING USES OF GOODS OR SERVICES USING BONDING AGREEMENT

BACKGROUND

The present disclosure relates to authorizing uses of goods or services using bonding agreements.

Current authorization techniques for goods or services do not penalize authorized users who knowingly misuse their authorization. For example, an authorized person may permit an unauthorized person to use the authorized person's authorization (e.g., a user name and password of the authorized person) to access the good or service, effectively representing to the provider that the unauthorized person is the authorized person. Responsibility for the prevention of unauthorized access to the good or service typically falls upon the provider. Further, obtaining proper authorization may require a person to release sensitive or personally-identifying information that may require special legal or regulatory protections by the provider.

SUMMARY

According to one embodiment, a computer-implemented method comprises receiving, from a bonding service, an authorization request for a predefined authorized use of a good or service by a user. The authorization request indicates that the user meets one or more predefined criteria for the predefined authorized use. The method further comprises determining one or more penalty conditions of a bonding agreement for the predefined authorized use by the user. The method further comprises receiving, from the bonding service, a confirmation that the user agrees to meet the one or more penalty conditions of the bonding agreement. The method further comprises receiving, from an owner of the good or service, an authorization of the authorization request. The method further comprises transmitting, responsive to authorization of the authorization request, a token to the bonding service that enables the user to access the predefined authorized use of the good or service.

According to one embodiment, a system for an authorization service comprises one or more computer processors configured to receive, from a bonding service, an authorization request for a predefined authorized use of an electronic a good or service by a user. The authorization request indicates that the user meets one or more predefined criteria for the predefined authorized use. The one or more computer processors are further configured to determine one or more penalty conditions of a bonding agreement for the predefined authorized use by the user, and to receive, from the bonding service, a confirmation that the user agrees to meet the one or more penalty conditions of the bonding agreement. The one or more computer processors are further configured to receive, from an owner of the good or service, an authorization of the authorization request, and to transmit, responsive to authorization of the authorization request, a token to the bonding service that enables the user to access the predefined authorized use of the good or service.

According to one embodiment, a computer program product comprises a computer-readable storage medium having computer-readable program code embodied therewith. The computer-readable program code is executable by one or more computer processors to perform an operation comprising receiving, from a bonding service, an authorization request for a predefined authorized use of a good or service by a user. The authorization request indicates that the user meets one or more predefined criteria for the predefined authorized use. The operation further comprises determining one or more penalty conditions of a bonding agreement for the predefined authorized use by the user, and receiving, from the bonding service, a confirmation that the user agrees to meet the one or more penalty conditions of the bonding agreement. The operation further comprises receiving, from an owner of the good or service, an authorization of the authorization request, and transmitting, responsive to authorization of the authorization request, a token to the bonding service that enables the user to access the predefined authorized use of the good or service.

DETAILED DESCRIPTION

Figure 1:
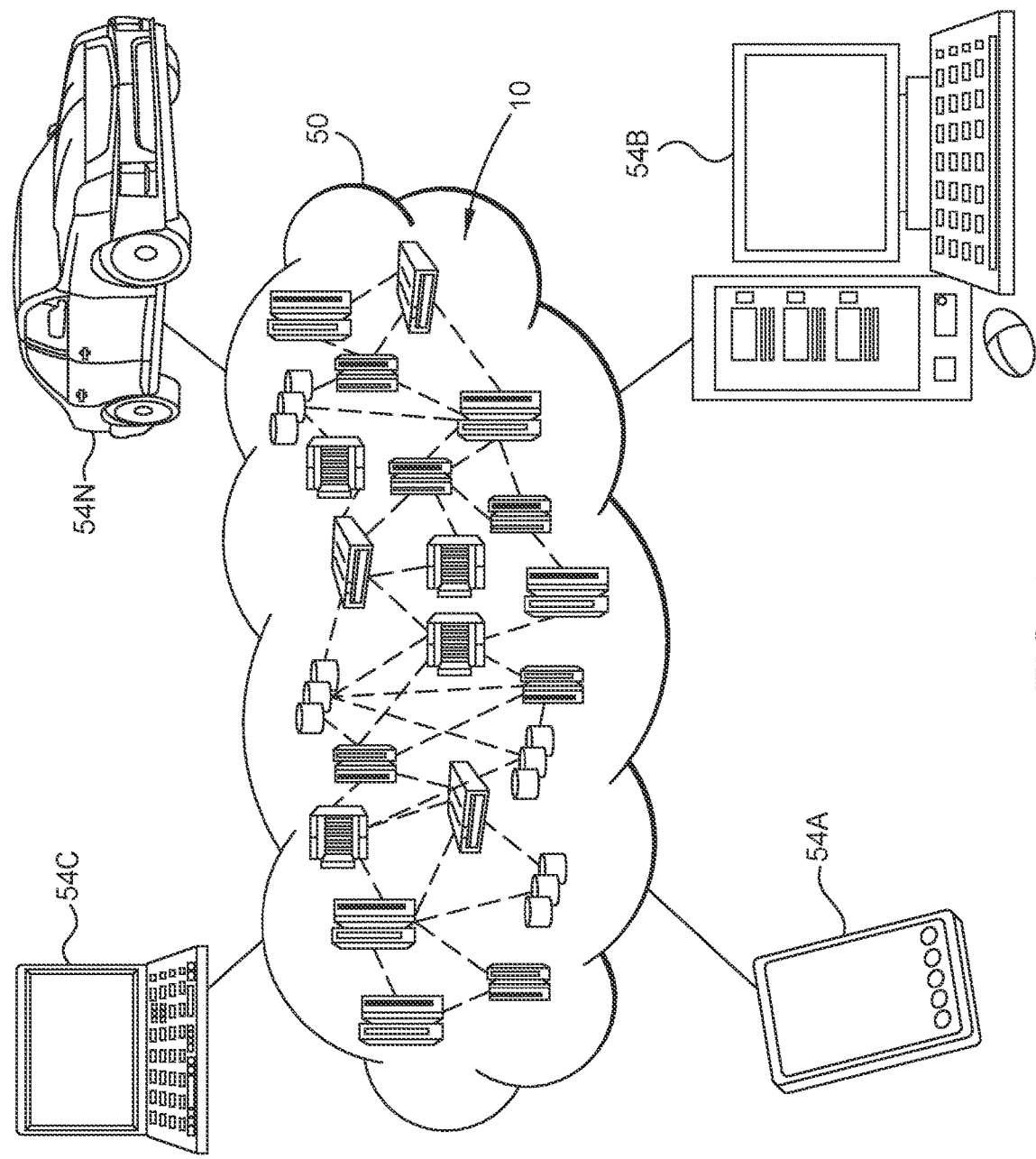
FIG. 1 depicts a cloud computing environment according to an embodiment of the present invention.

Embodiments described herein include a computer-implemented method, system, and computer program product for authorizing uses of goods or services. The method comprises receiving, from a bonding service, an authorization request for a predefined authorized use of a good or service by a user. The authorization request indicates that the user meets one or more predefined criteria for the predefined authorized use. The method further comprises determining one or more penalty conditions of a bonding agreement for the predefined authorized use by the user, and receiving, from the bonding service, a confirmation that the user agrees to meet the one or more penalty conditions of the bonding agreement. The method further comprises receiving, from an owner of the good or service, an authorization of the authorization request, and transmitting, responsive to authorization of the authorization request, a token to the bonding service that enables the user to access the predefined authorized use of the good or service.

Using the authorization system, the user enters into the bonding agreement that confirms that the user agrees to meet one or more conditions of use for the good or service, including one or more penalty conditions. The bonding agreement may further specify that third parties, such as an investigating service, may be rewarded for reporting that the user is not using their authorization correctly. Beneficially, the authorization system may effectively shift the responsibility for ensuring proper use of the authorization from the provider to the authorized user (whether the user is a person or another entity). The authorization system thus encourages the authenticated users to use their authorization correctly, and may enforce penalties for improper uses of the authorization.

The authorization system may also be effective to obtain authorizations for the good or service without divulging sensitive or personally-identifying information of the user. In some embodiments, the authorization service may communicate with the bonding service using a zero-knowledge protocol. In addition to protecting sensitive information, use of the zero-knowledge protocol may encourage agreements for use of the good or service that are free of biases or prejudices, as the bonding agreements are based on the agreed-upon condition(s) and are not based on other, personal factors.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
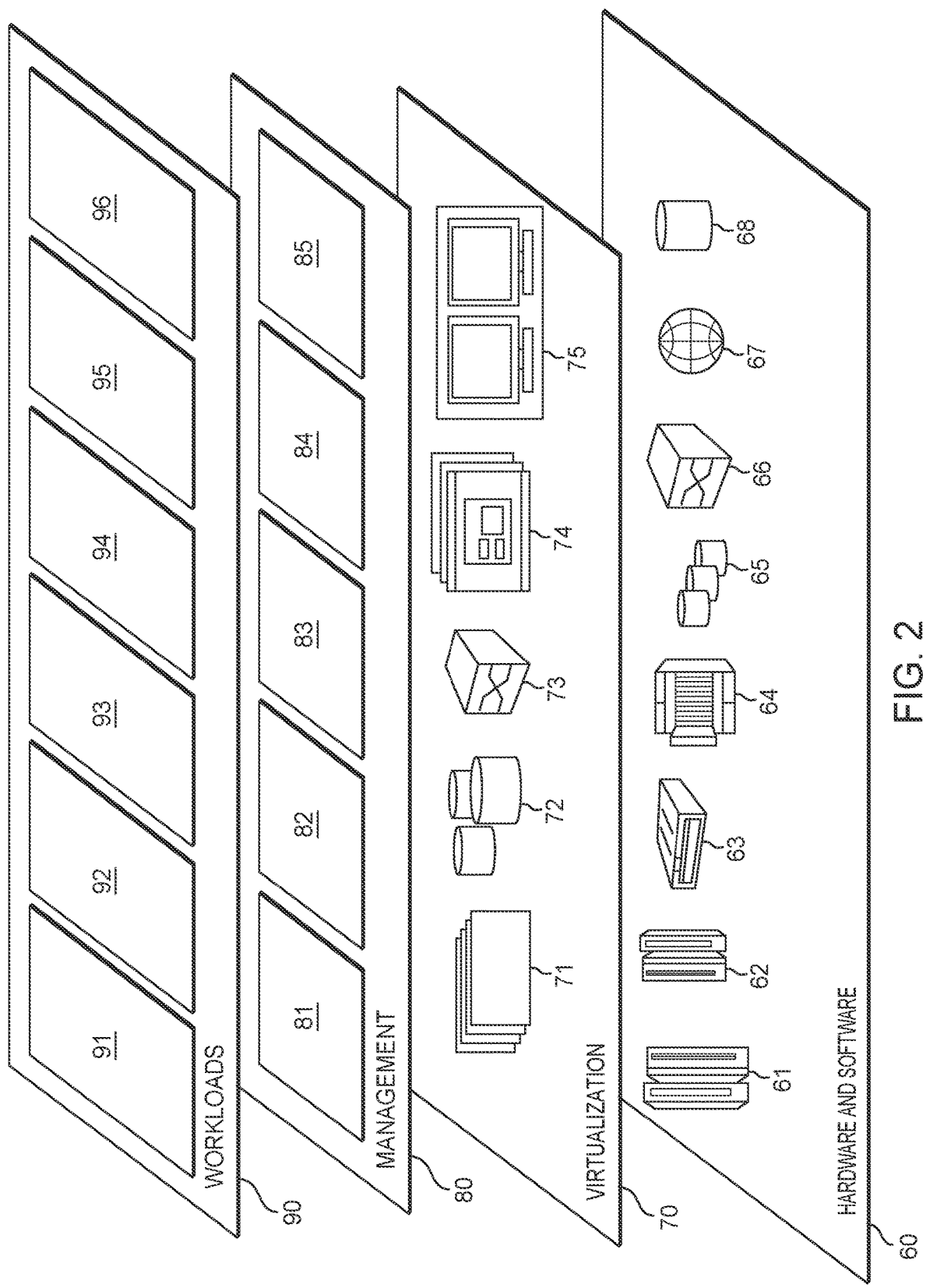
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authorization service 96.

The authorization service 96 is generally configured to communicate with a user and/or a bonding service to authorize user requests for predefined authorized uses of an electronic service. In some embodiments, the authorization service 96 negotiates one or more conditions for a bonding agreement. In some embodiments, the authorization service 96 may communicate with an investigating service to investigate the usage of the electronic service by the user. In some embodiments, the authorization service 96 causes one or more penalty conditions of the bonding agreement to be invoked responsive to determining the unauthorized use.

Figure 3A:
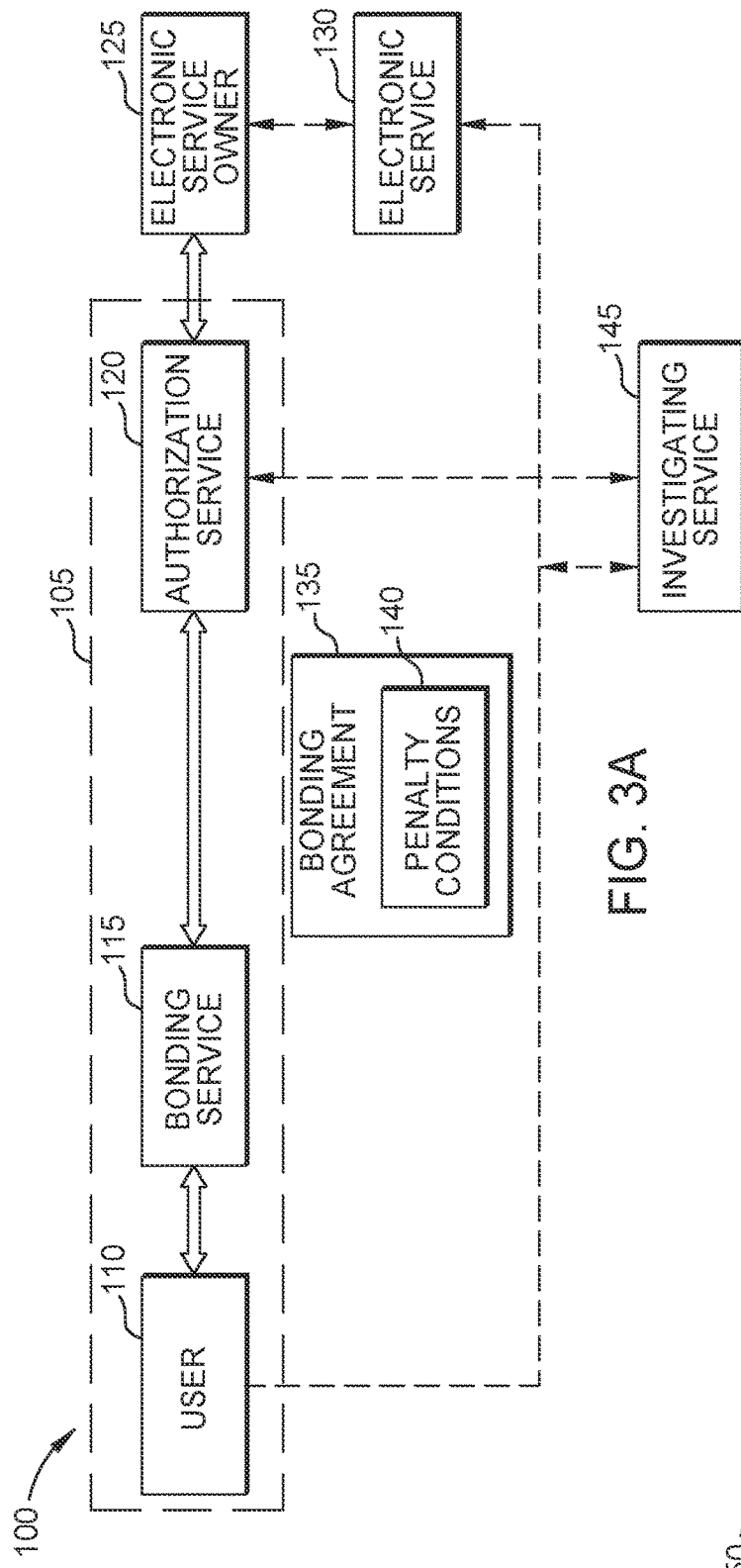
FIG. 3A is a block diagram of an authorization system for authorizing uses of a good or service, according to one or more embodiments.

FIG. 3A is a block diagram 100 of an authorization system 105 for authorizing uses of a good or service 130, according to one or more embodiments. The authorization system 105 comprises a user 110, a bonding service 115, and an authorization service 120. The user 110 may represent a computing device of a person or another entity (e.g., an organization). The user 110 seeks to acquire a predefined authorized use of the good or service 130. The good or service 130 may be implemented in any suitable form, such as tangible items or services, electronic services, and so forth. Some non-limiting examples of the good or service 130 may be implemented in any suitable form, such as access to and/or particular uses of software executed using the computing device of the user 110, electronic identity verification, electronic ticketing, electronic rentals (e.g., car, lodging, books, movies), and so forth. In one non-limiting example, the user 110 seeks to verify his or her identify to obtain a student license or other discounted license for a software product. In some cases, the user 110 may have a preexisting relationship with the good or service 130. For example, the user 110 may have the software preinstalled on the computing device and seeks to "unlock" additional functionality of the software.

The user 110 requests that the bonding service 115 obtain the authorization for a predefined authorized use of the good or service 130. The bonding service 115 may represent a computing device of a person or another entity (e.g., an organization). In some embodiments, the user 110 and the bonding service 115 are distinct entities. In other embodiments, however, the user 110 and the bonding service 115 may be the same entity.

In some embodiments, the user 110 has a preexisting "trusted" relationship with the bonding service 115. For example, the bonding service 115 may maintain an account associated with the user 110, storing information for the user 110 that is associated with predefined criteria for predefined authorized uses of the good or service 130.

In some embodiments, the bonding service 115 determines whether the user 110 meets one or more predefined criteria for the predefined authorized use that is requested by the user 110. Using the example of obtaining a student license for an electronic service, a current enrollment of the user 110 at the school or institution may be one of the one or more predefined criteria. To verify the enrollment of the user 110, the bonding service 115 may contact an electronic clearinghouse, or may contact the school or institution directly. Other predefined criteria are also contemplated, such as an age of the user 110, a financial need of the user 110, and so forth. In alternate embodiments, the bonding service 115 need not determine whether the user 110 meets one or more predefined criteria. In such a case, the user 110 and/or the bonding service 115 remain responsible for meeting the terms of the usage of the good or service 130 as agreed upon with an owner 125 of the good or service 130.

Responsive to determining that the user 110 meets the one or more predefined criteria for the predefined authorized use, the bonding service 115 transmits an authorization request to the authorization service 120 for the predefined authorized use of the good or service 130 by the user 110. Thus, the authorization request indicates that the user 110 meets the one or more predefined criteria. The authorization service 120 may represent a computing device of a person or another entity (e.g., an organization). In some embodiments, the authorization service 120 and the bonding service 115 are distinct entities.

In some embodiments, the bonding service 115 and/or the authorization service 120 determine one or more conditions for a bonding agreement 135. In some embodiments, the one or more conditions comprises one or more penalty conditions 140 that will be imposed if the user 110 exceeds the authorization provided for the predefined authorized use (e.g., allowing another person to access the good or service 130 using the credentials of the user 110). In some embodiments, the one or more penalty conditions 140 comprise a forfeiture of an amount of money from the user 110, and the authorization service 120 may electronically transfer the amount of money responsive to determining that the user 110 exceeds the authorization. Other penalty conditions 140 are also contemplated, such as other types of rewards, providing a warning to the user 110, a rescission of the authorization, and so forth.

In some embodiments, the one or more conditions for the bonding agreement 135 are predefined for the good or service 130 and/or for the predefined authorized use of the good or service 130. In other embodiments, the bonding service 115 and/or the authorization service 120 negotiate the one or more conditions for the bonding agreement 135. For example, the authorization service 120 may propose a monetary forfeiture as one of the one or more penalty conditions 140 by default, and the bonding service 115 may decline the monetary forfeiture where it would pose an undue burden to the user 110 (e.g., the user 110 already has a financial need).

The bonding service 115 transmits a confirmation to the authorization service 120 that the user 110 agrees to meet the conditions of the bonding agreement 135, including the one or more penalty conditions 140. Responsive to the confirmation, the authorization service 120 agrees to authorize the user 110 and may transmit an approved request to an owner 125 of the good or service 130. The owner 125 may represent a computing device of a person or another entity (e.g., an organization). In some embodiments, the owner 125 and the authorization service 120 are distinct entities. In other embodiments, however, the owner 125 and the authorization service 120 may be the same entity. In some embodiments, the approved request transmitted by the authorization service 120 indicates that the user 110 (i) meets the one or more predefined criteria for the predefined authorized use and (ii) has agreed to the conditions of the bonding agreement 135 (including the one or more penalty conditions 140).

In some embodiments, the bonding service 115 communicates with the authorization service 120 using a zero-knowledge protocol (ZKP) when seeking authorization for the predefined authorized use of the good or service 130. As defined herein, a ZKP is a computer-facilitated cryptographic protocol by which a "prover" (e.g., the bonding service 115) can prove to a "verifier" (e.g., the authorization service 120) (i) and/or (ii) above without divulging any sensitive and/or personally-identifying information about the user 110.

Generally, according to the ZKP, the bonding service 115 may perform a number of iterations of a function to verify that the user 110 is qualified according to the one or more predefined criteria and/or the bonding agreement 135. Using the ZKP, a single iteration may be inadequate to confirm the qualification of the user 110, but the number of iterations may be selected such that a probability of a fraudulent (unqualified) user 110 accessing the good or service 130 is sufficiently small.

Beneficially, the ZKP allows the sensitive and/or personally-identifying information to be protected, and may encourage agreements for use of the good or service 130 that are free of biases or prejudices, as the bonding agreements are based exclusively on the agreed-upon condition(s). In alternate embodiments, the bonding service 115 may communicate with the authorization service 120 using other cryptographic protocol(s).

Responsive to the approved request from the authorization service 120, the electronic service owner 125 may issue a token or other credential that enables the user 110 to access the predefined authorized use of the good or service 130. For example, the user 110 may receive a product key that is entered by the user 110 and communicated to the good or service 130. In some embodiments, the authorization service 120 communicates the token to the bonding service 115, which communicates the token to the user 110. In alternate embodiments, the authorization service 120 itself may issue the token or other credential.

In some embodiments, the good or service 130 may be configured to determine an unauthorized use of the good or service 130 (e.g., exceeding the terms of the authorization). In one example, the good or service 130 may log a usage of the good or service 130. In another example, the good or service 130 may identify access by an unauthorized user using the credential of the user 110 based on location information (such as an originating IP address that is incompatible with a location of the user 110) and so forth.

An entity other than the good or service 130 may be used to determine the unauthorized use of the good or service 130. In some embodiments, the authorization service 120 may transmit one or more indicators that are used to determine an unauthorized use of the good or service 130. In some embodiments, the one or more indicators comprise a hash value corresponding to one or both of the authorization request and the confirmation of the terms of the bonding agreement 135 from the bonding service 115. Although the hash value may be recorded and indexable to the bonding service 115 and/or the authorization service 120, the hash value may be meaningless to any other party.

In some embodiments, the hash value is included in a watermark that is embedded in documents generated (or edited) using the good or service 130. Other types of indicators, which may or may not be specific to the authorization transaction between the bonding service 115 and the authorization service 120, are also contemplated.

In some embodiments, the authorization service 120 may advertise, publish, or otherwise transmit the one or more indicators to enable an investigating service 145 to investigate the usage of the good or service 130 by the user 110. The investigating service 145 may represent a computing device of a person or another entity (e.g., an organization).

Using the example of obtaining a student license for the electronic service, the authorization service 120 may publish the hash value to a website or other electronic repository. The investigating service 145 may access the website, and may search for the hash value in a watermark in a document generated by the electronic service. For example, one of the conditions of the bonding agreement 135 for a student license may be a prohibition on commercial uses of the electronic service. The investigating service 145 may identify an unauthorized use of the electronic service by identifying the hash value within a document that is directed to a commercial use (e.g., within a watermark of a sale contract document viewable on a website).

In some embodiments, responsive to determining the unauthorized use, the investigating service 145 generates a report indicating that the user 110 has been determined, based on detection of the one or more indicators, to have performed an unauthorized use of the good or service 130. In an alternate embodiments, the report by the investigating service may indicate that the unauthorized use of the good or service 130 corresponds to the token or other credential of the user 110 (e.g., an unauthorized access by someone other than the user 110).

The authorization service 120 receives the report from the investigating service 145. In some embodiments, the authorization service 120 verifies the unauthorized use and contacts the bonding service 115. In other embodiments, the authorization service 120 first contacts the bonding service

115, which verifies the unauthorized use. In any event, the authorization service 120 and/or the bonding service 115 may cause the one or more penalty conditions 140 to be invoked responsive to determining the unauthorized use. Some non-limiting examples of the one or more penalty conditions 140 are discussed above. In some embodiments, the one or more penalty conditions 140 comprise a forfeiture of an amount of money from the user 110, and the authorization service 120 electronically transfers the amount of money (e.g., as a reward) to the investigating service 145. In other embodiments, the bonding service 115 electronically transfers the amount of money to the investigating service 145. For example, the user 110 may be required to make an up-front deposit that may be forfeited when an unauthorized use is determined, and that may be refunded to the user 110 when no unauthorized use is determined (e.g., over a predetermined duration). In some embodiments, the investigating service 145 may be required to agree to a separate bond and/or to agree to a dispute resolution process in order to discourage fraudulent claims of unauthorized use.

Using the bonding agreement 135, the authorization system 105 shifts the risk of unauthorized use of the good or service 130 to the user 110. The authorization system 105 may also encourage and/or incentivize the investigating service 145 to search for unauthorized uses of the good or service 130. The authorization system 105 may be employed in any suitable environment, and may be well-suited for controlling access to electronic services for subsets of the population, such as age-based (e.g., senior citizen) discounts, age-restricted websites or apps, and so forth.

Figure 3B:
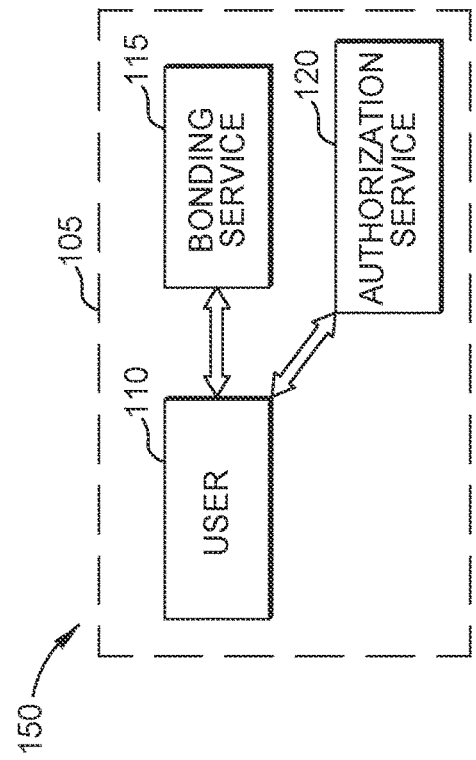
FIG. 3B is a block diagram of an alternate implementation of an authorization system, according to one or more embodiments.

FIG. 3B is a block diagram 150 of an alternate implementation of the authorization system 105, according to one or more embodiments. In the block diagram 150, the bonding service 115 and the authorization service 120 are not communicatively coupled. When requesting authorization for a predefined authorized use of the good or service 130, the user 110 contacts the bonding service 115 and obtains a bonding token or credential that indicates that the user 110 meets one or more predefined criteria for the predefined authorized use. The user 110 presents the bonding token or credential to the authorization service 120 to obtain the authorization. In some embodiments, the connections between the user 110 and the bonding service 115, and between the user 110 and the authorization service 120 each may employ ZKP protocols.

Figure 4:
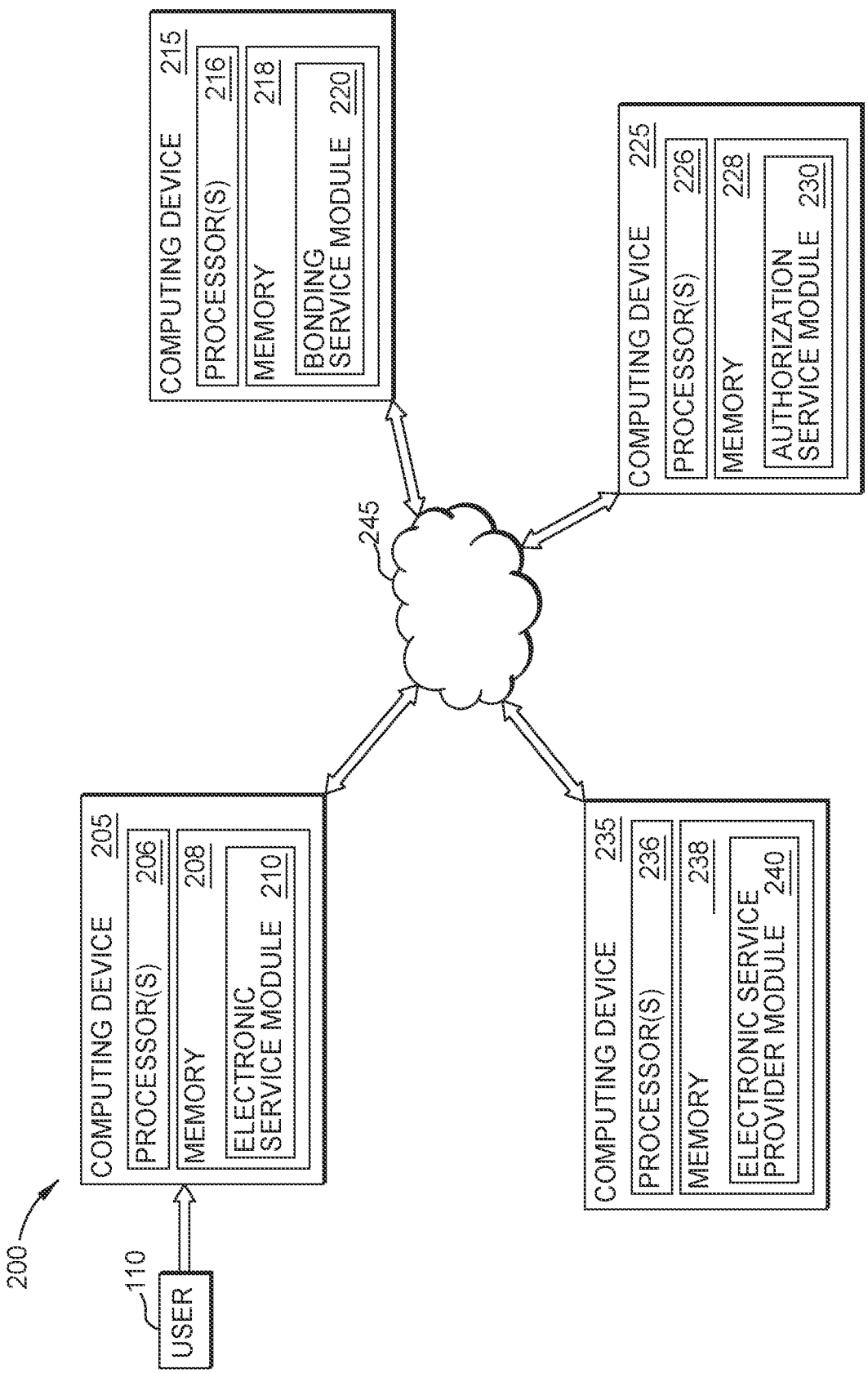
FIG. 4 is a system diagram for an authorization system, according to one or more embodiments.

FIG. 4 is a system diagram 200 for an authorization system, according to one or more embodiments. The features illustrated in FIG. 4 may be used in conjunction with other embodiments. For example, the system diagram 200 represents one possible implementation of the block diagram 100 of FIG. 3A.

In the system diagram 200, computing devices 205, 215, 225, 235 are communicatively coupled to a network 245. Each of the computing devices 205, 215, 225, 235 comprises a respective one or more computer processors 206, 216, 226, 236 and a respective memory 208, 218, 228, 238. The one or more computer processors 206, 216, 226, 236 may be implemented in any suitable form, such as a general purpose microprocessor, a controller, an application-specific integrated circuit (ASIC), and so forth. The memory 208, 218, 228, 238 may include a variety of computer-readable media selected for their size, relative performance, or other capabilities: volatile and/or non-volatile media, removable and/or non-removable media, etc.

The computing devices 205, 215, 225, 235 may be implemented in any suitable form(s). In some cases, the computing device 205 may be implemented as a personal computing device or a mobile computing device of the user 110 (e.g., a smartphone, tablet, or wearable computing device). The computing device 215, 225, 235 may be implemented as servers.

The network 245 represents one or more networks of any suitable types, such as the Internet, a local area network (LAN), a wide area network (WAN), and/or a wireless network. The communicative links between the one or more computer processors 206, 216, 226, 236 and the network 245 may have any suitable implementation, such as copper transmission cable(s), optical transmission fiber(s), wireless transmission, router(s), firewall(s), switch(es), gateway computer(s), and/or edge server(s).

The memory 208, 218, 228, 238 may include one or more modules for performing various functions described herein. In one embodiment, each module includes program code that is executable by the one or more computer processors 206, 216, 226, 236. In another embodiment, each module is partially or fully implemented in hardware (i.e., circuitry) or firmware of the computing devices 205, 215, 225, 235 (e.g., as circuitry within the one or more computer processors 206, 216, 226, 236). However, other embodiments of the system diagram 200 may include modules that are partially or fully implemented in other hardware or firmware, such as hardware or firmware included in one or more other computing devices connected with the network, and so forth. Stated another way, the overall functionality of the one or more modules may be distributed among other devices of the system diagram 200.

As shown, the memory 208 comprises an electronic service module 210, the memory 218 comprises a bonding service module 220, the memory 228 comprises an authorization service module 230, and the memory 238 comprises an electronic service provider module 240. The electronic service module 210 generally provides access for the user 110 to the functionality of the good or service 130 of FIG. 3A. In some embodiments, the electronic service module 210 is implemented as an application (e.g., a browser or dedicated app) executed by the one or more computer processors 206.

The bonding service module 220 generally provides the functionality of the bonding service 115 of FIGS. 3A, 3B, the authorization service module 230 generally provides the functionality of the authorization service 120 of FIGS. 3A, 3B, and the electronic service provider module 240 generally provides the functionality of the good or service 130 of FIG. 3A.

Figure 5:
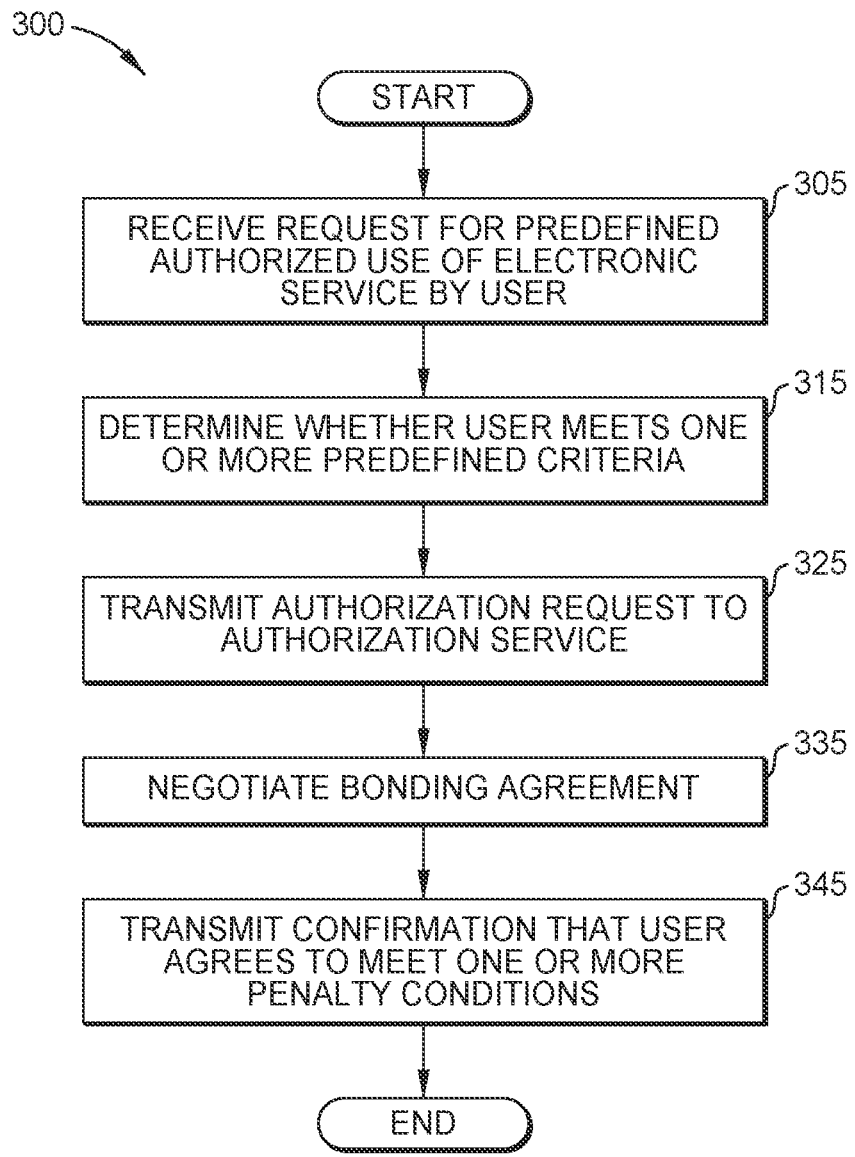
FIG. 5 is a method of operation of a bonding service for an authorization system, according to one or more embodiments.

FIG. 5 is a method 300 of operation of a bonding service for an authorization system, according to one or more embodiments. The features illustrated in FIG. 5 may be used in conjunction with other embodiments. For example, the method 300 represents one possible operation of the bonding service 115 of FIGS. 3A, 3B.

The method 300 begins at block 305, where the bonding service receives a request for a predefined authorized use of an electronic service by a user. At block 315, the bonding service determines whether the user meets one or more predefined criteria for the predefined authorized use. In some embodiments, the bonding service has a predefined trusted relationship with the user. At block 325, the bonding service transmits the authorization request to an authorization service (e.g., the authorization service 120 of FIGS. 3A, 3B). At block 335, the bonding service negotiates a bonding agreement with the authorization service. At block 345, the bonding service transmits a confirmation that the user agrees to meet one or more penalty conditions specified by the bonding agreement. The method 300 ends following completion of block 345.

Figure 6:
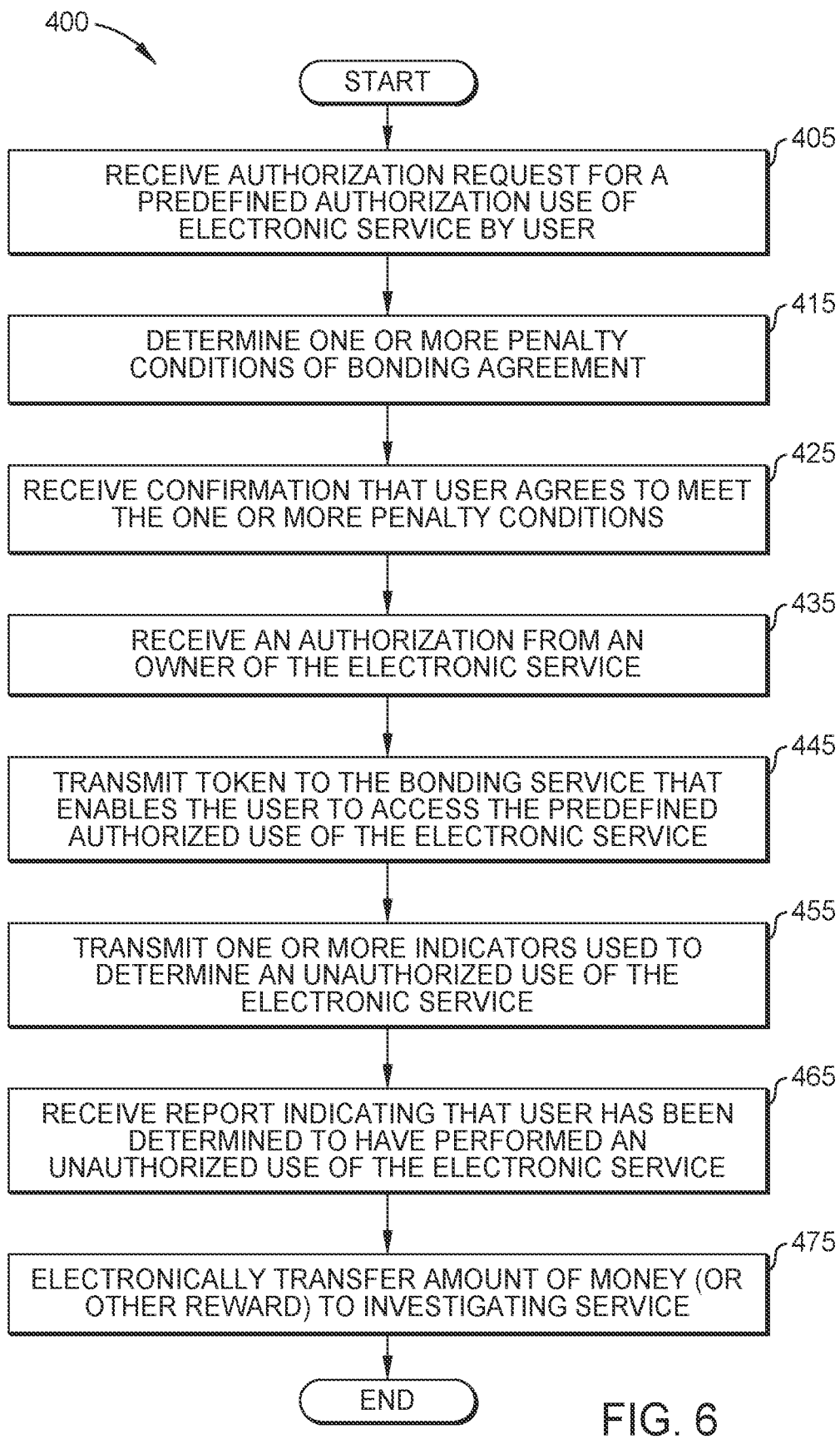
FIG. 6 is a method of operation of an authorization service for an authorization system, according to one or more embodiments.

FIG. 6 is a method 400 of operation of an authorization service for an authorization system, according to one or more embodiments. The features illustrated in FIG. 6 may be used in conjunction with other embodiments. For example, the method 400 represents one possible operation of the authorization service 120 of FIGS. 3A, 3B.

The method 400 begins at block 405, where the authorization service receives an authorization request for a predefined authorized use of electronic service by a user. In some embodiments, the authorization request indicates that the user meets one or more predefined criteria for the predefined authorized use. At block 415, the authorization service determines one or more penalty conditions of a bonding agreement. In some embodiments, the one or more penalty conditions comprise one or more of: a forfeiture of an amount of money from the user, providing a warning to the user, a rescission of the authorization, and so forth. In some embodiments, determining the one or more penalty conditions comprises notifying the user of the one or more penalty conditions.

In some embodiments, block 415 is performed after block 405. In other embodiments, block 415 may be performed before block 405. For example, the one or more penalty conditions may be predefined, for example when the electronic service is created and offered for use. In some embodiments, the one or more penalty conditions may be specified by the owner of the electronic service instead of the authorization service.

At block 425, the authorization service receives confirmations that the user agrees to meet the one or more penalty conditions. At block 435, the authorization service receives an authorization from an owner of the electronic service. At block 445, the authorization service transmits a token (or other credential) to the bonding service or to the user. The token enables the user to access the predefined authorized use of the electronic service.

At block 455, the authorization service transmits one or more indicators used to determine an unauthorized use of the electronic service. At block 465, the authorization service receives a report indicating that user has been determined to have performed an unauthorized use of the electronic service. At block 475, the authorization service electronically transfers an amount of money, or another reward, to an investigating service. The method 400 ends following completion of block 475.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., an authorization service for an electronic service) or related data available in the cloud. For example, the authorization service could execute on a computing system in the cloud and communicate with a bonding service to authorize a predefined authorized use of the electronic service. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
    receiving, by a computer and from a bonding service using a zero-knowledge protocol, an authorization request for a predefined authorized use of a good or service by a user, wherein the authorization request indicates that the user meets one or more predefined criteria for the predefined authorized use;
    determining, by the computer, one or more penalty conditions of a bonding agreement for the predefined authorized use by the user, wherein the one or more penalty conditions comprises a forfeiture of an amount of money from the user if the user performs an unauthorized use of the good or service;
    receiving, by the computer and from the bonding service, a confirmation that the user agrees to meet the one or more penalty conditions of the bonding agreement;

receiving, by the computer and from an owner of the good or service and in response to the confirmation that the user agrees to meet the one or more penalty conditions of the bonding agreement, an authorization of the authorization request;

transmitting, by the computer and responsive to authorization of the authorization request, a token to the bonding service that enables the user to access the predefined authorized use of the good or service;

authorizing, by the computer, the user to use the good or service in response to receiving the token from the user, wherein the user was provided the token from the bonding service;

after authorizing the user to use the good or service, transmitting, by the computer and to an investigating service separate from the bonding service and the user, a document generated or edited using the good or service, wherein a hash value is embedded in a watermark in the document, and wherein the hash value identifies at least one of the authorization request or the confirmation;

after transmitting the document, receiving, by the computer and from the investigating service, a report indicating that the user performed the unauthorized use of the good or service; and electronically transferring, by the computer, the amount of money from the bonding service to the investigating service based on the report.

2. The method of claim 1, wherein the good or service is an electronic service.

3. A system for an authorization service, the system comprising:
one or more computer processors configured to:
receive, from a bonding service using a zero-knowledge protocol, an authorization request for a predefined authorized use of a good or service by a user, wherein the authorization request indicates that the user meets one or more predefined criteria for the predefined authorized use;

determine one or more penalty conditions of a bonding agreement for the predefined authorized use by the user, wherein the one or more penalty conditions comprises a forfeiture of an amount of money from the user if the user performs an unauthorized use of the good or service;

receive, from the bonding service, a confirmation that the user agrees to meet the one or more penalty conditions of the bonding agreement;

receive, from an owner of the good or service and in response to the confirmation that the user agrees to meet the one or more penalty conditions of the bonding agreement, an authorization of the authorization request;

transmit, responsive to authorization of the authorization request, a token to the bonding service that enables the user to access the predefined authorized use of the good or service;

authorize the user to use the good or service in response to receiving the token from the user, wherein the user was provided the token from the bonding service;

after authorizing the user to use the good or service, transmitting, to an investigating service separate from the bonding service and the user, a document generated or edited using the good or service, wherein a hash value is embedded in a watermark in the document, and wherein the hash value identifies at least one of the authorization request or the confirmation;

after transmitting the document, receive, from the investigating, a report indicating that the user performed the unauthorized use of the good or service; and electronically transfer the amount of money from the bonding service to the investigating service based on the report.

4. The system of claim 3, wherein the good or service is an electronic service.

5. A computer program product comprising:
a computer-readable storage medium having computer-readable program code embodied therewith, the computer-readable program code executable by one or more computer processors to perform an operation comprising:
receiving, from a bonding service using a zero-knowledge protocol, an authorization request for a predefined authorized use of a good or service by a user, wherein the authorization request indicates that the user meets one or more predefined criteria for the predefined authorized use;

determining one or more penalty conditions of a bonding agreement for the predefined authorized use by the user, wherein the one or more penalty conditions comprises a forfeiture of an amount of money from the user if the user performs an unauthorized use of the good or service;

receiving, from the bonding service, a confirmation that the user agrees to meet the one or more penalty conditions of the bonding agreement;

receiving, from an owner of the good or service and in response to the confirmation that the user agrees to meet the one or more penalty conditions of the bonding agreement, an authorization of the authorization request;

transmitting, responsive to authorization of the authorization request, a token to the bonding service that enables the user to access the predefined authorized use of the good or service;

authorizing the user to use the good or service in response to receiving the token from the user, wherein the user was provided the token from the bonding service;

after authorizing the user to use the good or service, transmitting, to an investigating service separate from the bonding service and the user, a document generated or edited using the good or service, wherein a hash value is embedded in a watermark in the document, and wherein the hash value identifies at least one of the authorization request or the confirmation;

after transmitting the document, receiving, from the investigating service, a report indicating that the user performed the unauthorized use of the good or service; and electronically transferring the amount of money from the bonding service to the investigating service based on the report.

6. The computer program product of claim 5, wherein the good or service is an electronic service.

* * * * *